United States Patent Office 3,095,278
Patented June 25, 1963

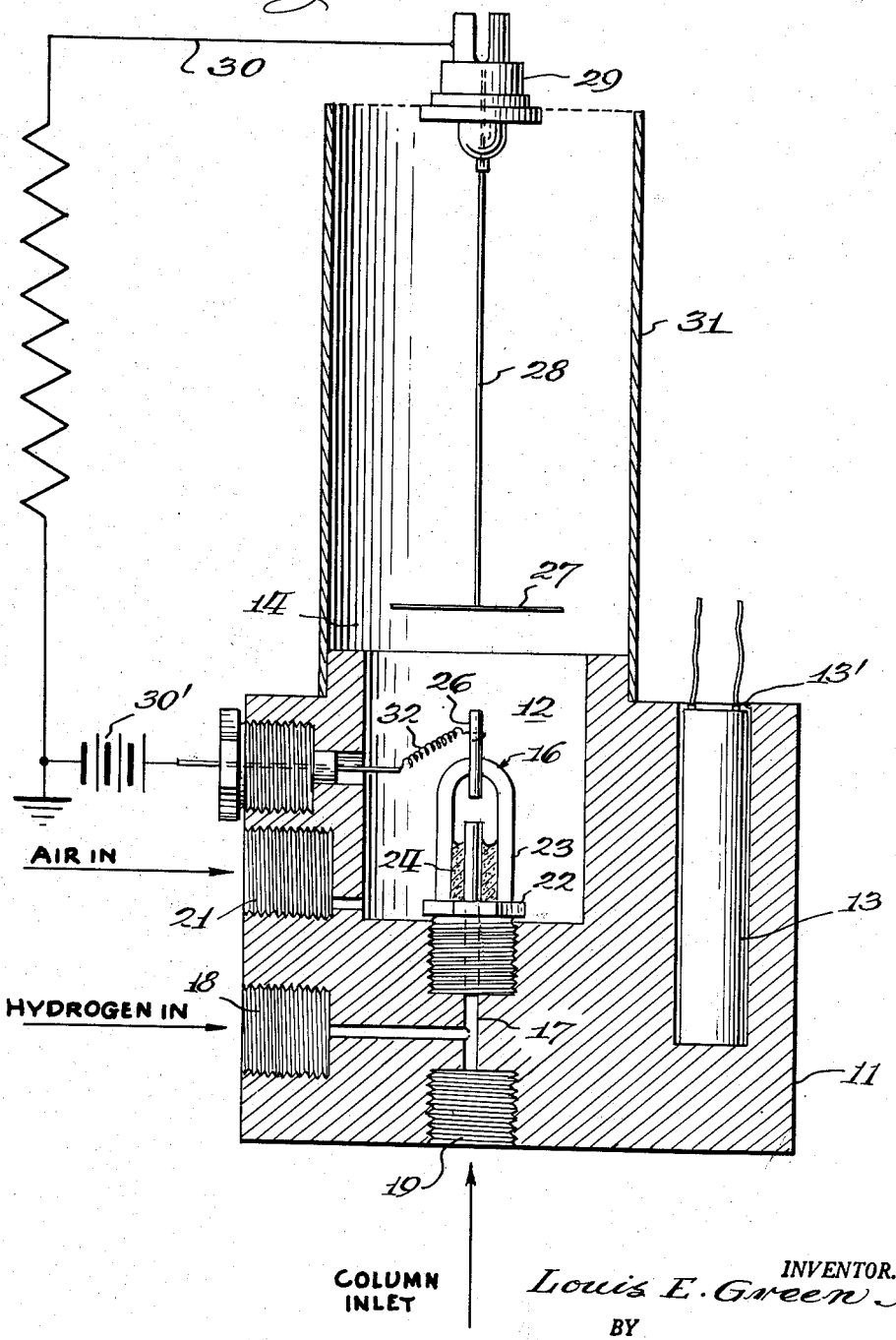

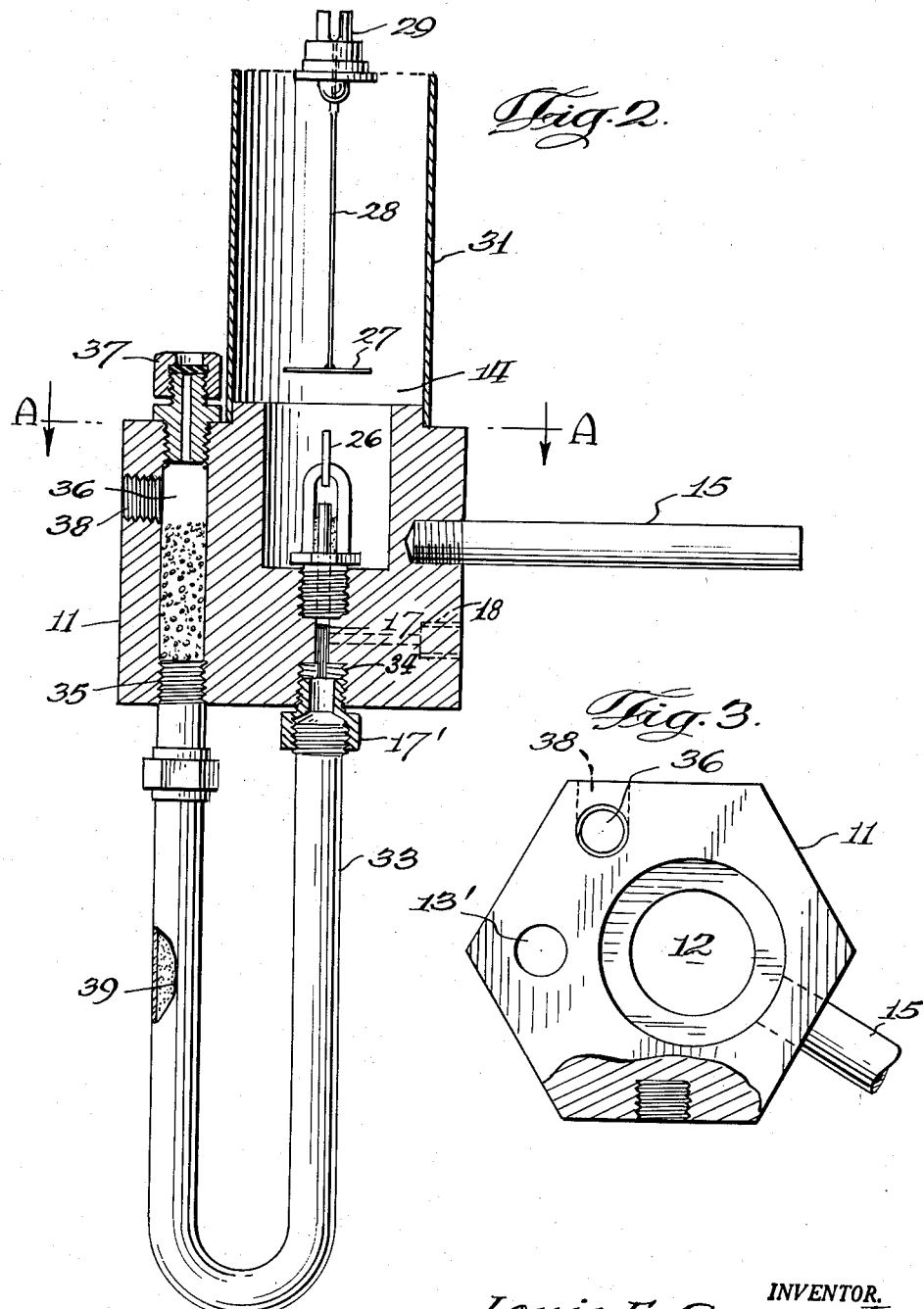

3,095,278
GAS ANALYSIS DEVICE
Louis E. Green, Jr., Chesterton, Ind., assignor to Standard Oil Company, Chicago, Ill., a corporation of Indiana
Filed Aug. 17, 1960, Ser. No. 50,127
8 Claims. (Cl. 23—254)

This invention relates to a device for producing an electrical signal which varies in strength according to the number of ionized particles produced by the combustion of a gaseous component introduced into the apparatus. More particularly this invention relates to a flame ionization detector which produces a signal substantially linear over a wide range of gas flow rates and temperatures. In another aspect, the invention relates to a flame ionization detector adapted for maintaining the desired detector operating temperature. Additionally, the present invention relates to a flame ionization detector and sample vaporizer adapted to be employed in gas chromatography apparatus.

The term "flame ionization detector" is applied generally to a device of the type described in the article by I. G. McWilliam and R. A. Dewar in Nature, London, 181, 760, 1958. The device utilizes the flame ionization principle to qualitatively and quantitatively analyze a small organic sample. In a typical operation of such a device a sample is burned with a combustion gas and ionized particles produced in the flame generate an ion current which is fed to a measuring instrument which indicates changes in the magnitude of the ion current.

Flame ionization detectors are particularly well adapted for identifying the components of a vaporized sample resolved in gas chromatography apparatus. Gas chromatography methods are well known in the art, and details of methods and apparatus employed in gas chromatography are described in the publication "Gas Chromatography" by A. I. M. Keulemans (Reinhold Publishing Corporation, New York (1957)).

However, flame ionization detectors are known to be sensitive to changes in gas flow rates so that the signal produced is not linear over a wide range of flow rates. Further, flame ionization detectors employed in gas chromatography are not well adapted for use with apparatus which is portable or designed to be used around a petroleum processing unit.

An object of this invention is a flame ionization detector which produces a signal response linear over a wide range of gas flow rates and temperatures which detector possesses a high degree of sensitivity, but nevertheless is rugged and inexpensive to produce. Another object is a flame ionization detector which may be operated at high temperatures, e.g., above 300° C., and in which loss of heat between a chromatographic column and the detector is minimized. A further object is a flame ionization detector adapted for use with portable gas chromatography apparatus which detector is provided with a self-contained heater to provide the desired detector operating temperature, and, if desired a sample vaporizer. Still a further object of the invention is a flame ionization detector which is adapted for ease of maintenance. Further objects of the invention will become apparent from the following description of the invention.

In brief, the present invention provides a flame ionization detector having a base member and heater means in contact therewith, the base member being adapted to act as a heat sink and provide a minimum detector operating temperature. The base member may also have contained therein a sample vaporizer in which high boiling sample components are heated and vaporized prior to being distributed on the packing of a gas chromatography column.

The flame ionization detector of the invention provides a linear response over a wide range of gas flow rates. A stream of sample gas and a stream of combustion gas are premixed prior to introduction into the combustion chamber of the detector so that the flow rate of the sample gas to the detector is substantially unaffected by the introduction of the combustion gas and dilution is minimized.

The apparatus of the invention also provides a burner member comprising an insulator member having a jet electrode member sealed therein, which burner member slidably engages in gas-sealing contact with the mixed gas inlet. The jet electrode member is electrically connected to a high voltage source by an electric conductor which frictionally engages with the jet electrode member whereby the jet electrode member is maintained electrically insulated from the base member and permits the burner member to be readily removed from the detector.

A better understanding of my invention will be had from the following description of a particular embodiment of the invention and from the accompanying drawings wherein:

FIGURE 1 illustrates a cross-sectional view of a preferred embodiment of the invention.

FIGURE 2 illustrates another cross-sectional view of the detector of FIGURE 1 showing a sample vaporizer integral with the detector which is used in conjunction with gas chromatography apparatus, and FIGURE 3 is a cross-section of the detector base member taken at line A—A of FIGURE 2.

Referring to FIGURE 1, a base member 11 having a combustion chamber 12 provided therein is constructed of a material having sufficient thermal conductivity to distribute heat supplied by heater means 13 to maintain a temperature within the flame ionization detector 14 at least above the dew point of vapors in the detector. The base member 11 may be constructed of any material possessing suitable mechanical properties and having a thermal conductivity great enough to readily conduct heat from the heater 13 throughout the mass of the base member. Preferably, the base member 11 is constructed of a metallic material, such as an aluminum alloy, although other materials such as brass or copper may be employed for this purpose. It is important that the base member 11 have a large mass, in order to act as a heat sink, thereby preventing sudden drops in detector operating temperature. A support for the base, such as the support rod 15, may be provided to secure the base 11.

A combustion chamber 12 is provided by machining or otherwise forming a central recess in the base member 11 to a depth great enough to enclose the burner member 16 in the combustion chamber. The heater 13 may be contained in the recess 13' to more effectively distribute heat throughout the base 11.

A mixed gas inlet 17 is provided in the base member 11 whereby a mixed stream of combustion gas and column effluent containing sample gas components are admitted into the detector. It is important that the combustion gas stream, conventionally hydrogen gas, is introduced into the column effluent stream in a manner so as not to create a back pressure against which the column effluent stream must work in order to flow into the detector. The combustion gas stream may be introduced into the sample-gas-containing stream exteriorly of the detector, however, it is preferable to provide a hydrogen inlet 18 and a sample gas inlet 19 in the base member 11, as shown in FIGURE 1, so that the combustion gas stream is introduced in a manner to avoid creating a back pressure in the mixed gas inlet 17.

An air supply conduit 21 provides oxygen to the flame ionization detector in quantities at least sufficient for complete combustion of the gases entering the detector and also serves to sweep combustion products from the detector. Advantageously, this oxygen may be introduced through an opening in the base member 11 through which oxygen or clean air is admitted to the detector. This opening is sized so that air flow into the combustion chamber does not cause turbulence which may result in an increased background signal.

Heater means 13 provides suitable heat which is distributed throughout the base member 11 so that the operating temperature of the detector is maintained at a temperature great enough to prevent the condensation of gases entering the detector or combustion products formed therein. Preferably, heat is supplied to the base member 11 by an electrical resistance heater embedded within the base member 11. However, other type heaters such as exteriorly mounted electrical heaters or tubes carrying a suitable heat medium may be employed as a source of heat.

The burner member 16 is adapted to fit the mixed gas inlet 17 in a manner so that the burner member 16 may be readily removed for cleaning or replacement. Advantageously, a pipe-to-tubing reducer 22 is threaded into the base member 11 to communicate with the mixed gas inlet 17. An insulator member 23 of a suitable electrically insulating material, preferably glass tubing, slides over the tubing connection of the reducer 22, and a gas-tight seal between the insulator and the tubing connection may be effected by employing a suitable gasketing material 24, preferably a silicone rubber gum.

A jet electrode member 26 constructed of an electrically conducting material, preferably small diameter platinum tubing is sealed into the upper end of the insulator member 23, and serves as the burner jet and also as one electrode of the detector. The size of the jet will vary depending upon the gas flow rates and the flame height desired in the detector. However, tubing having an internal diameter of about 0.015" has been found satisfactory with gas flow rates ranging from about 0.5 to 100 cc. per minute.

A collector electrode 27 is suitably positioned adjacent the jet electrode member 26. Preferably the collector electrode 27 is constructed of a pure platinum gauze of about 30 mesh size. Other materials and electrode shapes may be employed in the design of the collector electrode and the distance separating the collector electrode and the jet electrode also may vary, e.g., from about ½ cm. to 1 cm. above the flame. However, the collector electrode should be positioned a suitable distance above the burner flame to prevent heating the electrode to a temperature at which emitted electrons cause an increased background noise level. The collector electrode of fine gauze-like material advantageously presents an increased surface area on which the ionized particles from the combustion chamber may collect to provide the ion current generated in the detector.

An electrical conductor 28 serves to conduct the ion current from the collector electrode 27 to an electrical connector 29 situated exteriorly of the detector. A suitable shielded electrical conductor 30 may be used to carry the ion current, or detector signal, from the detector to an instrument for indicating the magnitude of the ion current produced by the detector. Generally the current is amplified by a suitable means prior to being fed to an ammeter, recording potentiometer, printing integrator or other suitable instrumentation.

A chimney member 31 is employed to vent the combustion products and cool the connector 29. The chimney member 31 is constructed of an electro-conductive material, such as brass tubing. Also, the chimney serves as a shield to prevent stray electromagnetic currents from interfering with the signal produced by the detector and thereby aids in reducing the noise level.

The jet electrode member 26 and the collector electrode 27 are connected across a high impedance in series with a high voltage source, 30' such as about 100 to 1000 volts, and preferably a 250 volt battery, in order to compensate for the high impedance across the flame. An electrical connection from the high voltage source advantageously is brought into the base member 11 through a bushing threaded into the base member, and contact with the jet electrode member is maintained by frictional engagement of the electrical conductor with the jet electrode, for example through a spring member 32, which preferably is of a high temperature resistant electrical wire material such as Nichrome.

When the sample to be resolved in a gas chromatography column contains high boiling components which are liquid at normal temperatures it is necessary to vaporize these components of the sample in order to properly distribute all of the components upon the packing material in the chromatography column. In such an instance, a heated sample vaporizer is required to vaporize the sample. Advantageously, the heat of the base member 11 may be employed to vaporize sample components charged to a gas chromatography column. Referring to FIGURE 2, the flame ionization detector 14 is employed with a gas chromatography column 33, and the mixed gas inlet 17 is connected to the column outlet 34 so as to receive the column effluent. The column inlet 35 is attached to the base member 11 in which a bore 36 is provided to communicate with a sample introduction means 37, which may comprise a sample charging valve, a serum cap and syringe, or the like. A carrier gas inlet 38 is connected to a source of carrier gas passed through the chromatographic column 33 and to carry a sample introduced through the sample introduction means 37 through the column. When utilizing the heated base member of the detector to vaporize the sample the temperature of the base member 11 is maintained at a temperature sufficiently high to vaporize the sample in the carrier gas stream. In order to aid in flash vaporizing the sample, the sample vaporization zone may be packed with a finely divided material to increase heat transfer. Materials which may be used for this purpose are glass beads, glass fibre, or other similar materials.

Upon vaporization, the sample is distributed upon a packing material 39 in the chromatographic column. This column packing may be a solid adsorbent such as a molecular sieve material, silica gel, activated alumina, etc., or may be a solid support such as crushed firebrick coated with a stationary liquid phase, such as hexadecane, silicone rubber or the like. When using a capillary column, the column may contain any suitable stationary phase.

The present invention thus is well adapted to be used with various type chromatographic columns and is particularly well adapted to be used with heated columns or temperature programmed columns in which the column temperature is raised during a run, wherein samples having wide boiling ranges are resolved.

It is understood that the foregoing is a description of a preferred embodiment of the present invention and numerous deviations in details of the construction may become apparent to one skilled in the art. The above description, therefore, is given by way of illustration and is not intended to limit the scope of the present invention.

To illustrate the improved operation of the flame ionization detector of this invention a comparison was made between the instant detector and a conventional commercially available detector, which is not provided with means for preventing a back pressure of combustion gas in the mixed gas inlet. The detector used for comparison purposes was such as described in the publication "The Design Considerations of a Gas Chromatography System Employing High Efficiency Golay Columns" by R. D. Condon, Analytical Chemistry, 31 p. 1717, October 1959, and also in the publication "Comparative Data on Two Ionization Detectors" by R. D. Condon, P. R. Scholly and W. Averill, 3rd Symposium on Gas Chromatography at Edinburgh, Scotland (June 1960), p. 134.

A flame ionization detector as described herein and shown in the drawings and a commercial flame ionization detector of the type described in the above articles were tested under identical conditions and the relative sensitivity, back ground noise levels, and operation under changing flow rates of column gas were determined. The flame ionization detector of the present invention was provided with a back pressure reducing nozzle 17' fitted onto the column outlet 34, as shown in FIGURE 2, to further minimize the flow sensitivity of the detector. As shown in the drawing, the back-pressure reducing nozzle extends into the mixed gas inlet 17 to introduce the sample gas into the mixed gas inlet between the combustion gas inlet 18 and the combustion chamber, i.e., downstream of the point of communication of the combustion gas inlet 18 with the sample gas inlet 19, to effectively reduce the pressure against which the incoming sample gas must work in order to enter the detector. The same columns, e.g., a 100 ft. long capillary column coated with a liquid phase, was used and optimum flow rates of hydrogen and of air for each detector were employed. Two-tenths microliter samples of a 50:1 normal hexane in a normal heptane diluent were introduced into each apparatus, the sample separation was made and chromatographs recorded on a one millivolt recorder.

The relative sensitivities of the detectors were determined by a comparison of the peak areas of the chromatographs and the sensitivity of the detector of the present invention was found to be 35 times that of the conventional detector. The back ground noise level was observed to be 0.05 millivolt and 0.04 millivolt, respectively.

Changes in the flow rate of column gas were made to determine the relative flow sensitivities of the two detectors. It was observed that with the detector of the present invention a tenfold increase in gas flow rate caused no noticeable effects on the signal output of the detector, as shown by the recorded chromatograph. With the second system employing the ionization detector not provided with means for preventing hydrogen back pressure it was observed that about a three-fold increase in gas flow rate caused a one millivolt (full scale deflection) base line shift on the chromatograph and the detector flame was blown out.

Thus, the improved sample component sensitivity and the reduced flow insensitivity of the flame ionization detector of the present invention are apparent.

Having described my invention, what I claim is:

1. In a flame ionization detector adapted to receive sample components from a gas chromatography column and to identify said components, a base member of a thermally conductive material and of sufficiently large mass to provide a heat sink, heater means in contact with said base member, a sample vaporization chamber positioned in said base member, means for introducing a sample into said vaporization chamber, means for removing sample from said vaporization chamber, sample gas supply means positioned in said base member and adapted to receive sample from said vaporizer, said heater means being adapted to maintain said vaporization chamber at a temperature above the vaporization temperature of sample components introduced therein and to maintain a detector operating temperature at least above the dew point of vapors introduced into said detector.

2. A flame ionization detector adapted for use in gas chromatography apparatus in which a sample mixture is resolved into its components which detector comprises a thermally conductive base member, sample gas supply means, combustion gas supply means, means adapted to supply oxygen for combustion to said detector, a jet electrode member connected to said base member and in flow communication with said sample gas supply means and said combustion gas supply means to receive a sample gas stream and a combustion gas stream, a collector electrode member positioned adjacent said jet electrode member, heater means in contact with said base member, a sample vaporization chamber in said base member, and sample introduction means connected to said sample vaporization chamber, means for removing sample from said chamber, a packing material positioned within said chamber, said heater means and said base member being adapted to supply heat to said sample vaporization chamber whereby a sample mixture introduced into said apparatus is heated to at least a temperature above which the highest boiling component of said sample is vaporized.

3. A flame ionization detector comprising a base member, sample gas inlet in said base member, a combustion gas inlet in said base member, a mixed gas inlet in flow communication with said sample gas inlet and with said combustion gas inlet to receive a sample gas stream and a combustion gas stream and to mix said streams therein, means adapted to supply oxygen for combustion to said detector, a jet electrode member adapted to receive the resulting mixed gas stream, a collector electrode member positioned adjacent said jet electrode and adapted for collecting ion current, and a back-pressure reducing nozzle in flow communication with said sample gas inlet to introduce sample gas into said mixed gas inlet at a point past the point of communication of said combustion gas inlet with said mixed gas inlet.

4. A flame ionization detector adapted to provide a substantially linear response over a wide range of gas flow rates and temperatures which detector comprises a base member provided with a recessed combustion chamber contained therein, said base member being constructed of a thermally conductive material and being of a sufficiently large mass to provide a heat sink, heater means within said base member, said heater means and said base member being adapted to provide a detector operating temperature at least above the dew point of vapors introduced into said detector, sample gas supply means in said base member, a combustion gas inlet in said base member, a mixed gas inlet in said base member to receive a stream of sample gas and a stream of combustion gas from said sample gas supply means and from said combustion gas inlet, respectively, and to introduce a stream of sample gas and combustion gas in admixture into said combustion chamber, oxygen supply means adapted to provide oxygen to said combustion chamber, a burner member completely within said combustion chamber adapted to receive said mixed gas stream from said mixed gas inlet and to deliver said mixed gas stream to said combustion chamber, said burner member comprising an insulator member having a jet electrode member sealed therein, said jet electrode member being electrically insulated from said base member, a collector electrode member positioned adjacent said jet electrode member and adapted to collect an ion current, electrical conductor means adapted to conduct said ion current from said collector electrode exteriorly of said detector, a chimney member adapted to vent vapors from said combustion chamber and adapted to electromagnetically shield said collector electrode and said electrical conductor and a high voltage source connected to said jet electrode and maintained in electrical contact therewith by frictional engagement with an electrical conductor.

5. The flame ionization detector of claim 4 wherein there is provided a sample vaporization chamber positioned in said base member, a packing material in said vaporization chamber, sample introduction means connected to said vaporization chamber, and outlet means for transferring sample from said vaporization chamber to said sample gas supply means.

6. The flame ionization detector of claim 4 wherein said sample gas supply means is provided with a back pressure reducing nozzle adapted to introduce the sample gas into said mixed gas inlet between the combustion gas inlet and the combustion chamber.

7. A flame ionization detector which comprises a base member, a combustion chamber in said base member, said base member being constructed of a thermally conductive material and being of a sufficiently large mass providing a heat sink, heater means in contact with said base member, a sample gas inlet in said base member, a combustion gas inlet in said base member, a mixed gas inlet adapted to receive a stream of sample gas and a stream of combustion gas and to mix said streams therein, oxygen supply means adapted to provide oxygen to said combustion chamber, a jet electrode member adapted to receive a mixed gas stream from said mixed gas inlet, a collector electrode member positioned adjacent said jet electrode member and adapted to collect an ion current, said combustion chamber being recessed in said base member and completely containing said jet electrode member, a back-pressure reducing nozzle positioned in said sample gas inlet and extending into said mixed gas inlet past the point of communication of said combustion gas inlet with said mixed gas inlet, a sample vaporization chamber in said base member, means for introducing a sample into said vaporization chamber, and means for removing sample from said vaporization chamber whereby said removed sample can be passed to said sample inlet.

8. A flame ionization detector comprising a massive, thermally conductive base member; a combustion chamber recessed within said massive base member; a burner member provided with a jet electrode member, said burner member and said jet electrode being positioned entirely within said recessed chamber; sample gas supply means in said base member; combustion gas supply means in said base member; means for receiving a stream of sample gas and a stream of combustion gas and for passing a stream of sample gas and combustion gas in admixture to said burner member and said jet electrode; a collector electrode positioned adjacent said jet electrode and adapted to collect an ion current; heater means within said base member, said heater means and said base member being adapted to provide a detector operating temperature at least above the dew point of vapors introduced into said detector.

References Cited in the file of this patent

Thompson: "J. Chromatog.," 2, 148–154 (1959).
De Wet et al.: "Anal. Chem.," 32, 169-174 (1960).